(12) United States Patent
Hunt

(10) Patent No.: US 6,564,370 B1
(45) Date of Patent: May 13, 2003

(54) ATTRIBUTE SIGNATURE SCHEMA AND METHOD OF USE IN A DIRECTORY SERVICE

(75) Inventor: Gary Thomas Hunt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/306,191

(22) Filed: May 6, 1999

(51) Int. Cl.[7] ................................................ G06F 9/44
(52) U.S. Cl. .................. 717/122; 717/120; 717/121; 717/123; 717/170; 717/171; 707/3; 707/6
(58) Field of Search ................................. 717/170–171, 717/120–122; 707/3, 102, 103, 203, 6

(56) References Cited

U.S. PATENT DOCUMENTS 5,161,223 A * 11/1992 Abraham ...................... 707/73
5,499,365 A    3/1996 Anderson et al.
6,035,303 A * 3/2000 Baer et al. ................... 707/103

OTHER PUBLICATIONS

Davison et al., "A Visual Interface For a Database with Version Management", ACM, pp. 226–256, Jul. 1986.*
Conradi et al., "Version Models for Software Configuration Management", ACM, pp. 232–282, Jun. 1998.*
Jan Skibinski, Numeric Quest Inc., "Xcoral editor & Java Browser," Oct. 23, 1996, pp. 1–13.

* cited by examiner

*Primary Examiner*—Gregory Morse
*Assistant Examiner*—Ted T. Vo
(74) *Attorney, Agent, or Firm*—Jeffrey S. LaBaw; Joseph R. Burwell; David H. Judson

(57) ABSTRACT

A directory schema for directory applications or platforms that store common attributes in a distributed directory. According to the schema, a given attribute is stored in a directory together with a signature that identifies given information, e.g., the purpose and version of the attribute. Thus, when an attribute is migrated to a new value, e.g., upon the release of a new application version, the directory schema need not be extended. Rather, the attribute may be maintained in the schema is the same location as was used with an earlier application version.

19 Claims, 3 Drawing Sheets

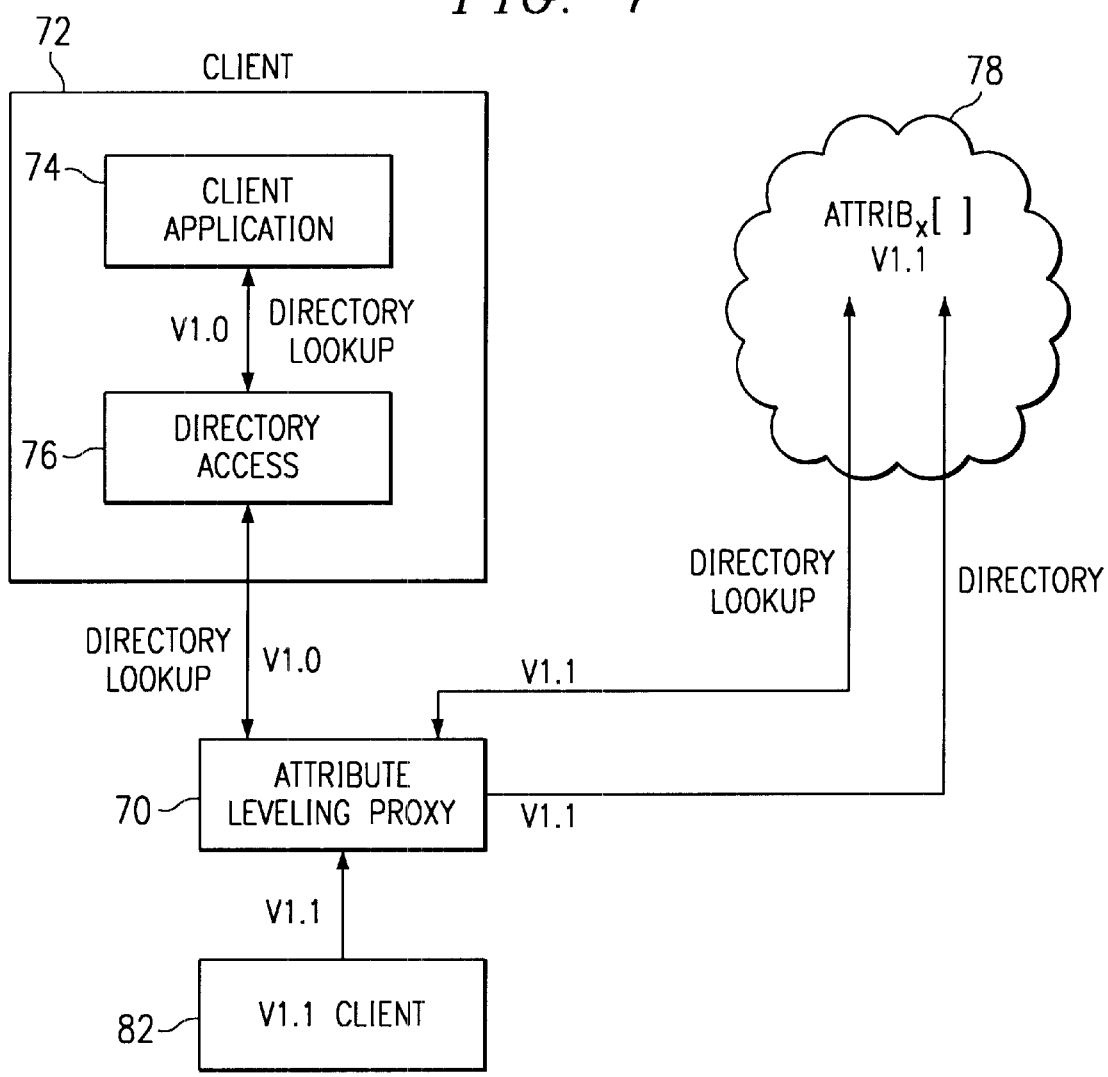

ATTRIBUTE SIGNATURE SCHEMA AND METHOD OF USE IN A DIRECTORY SERVICE

BACKGROUND OF THE INVENTION

1. Technical Field

This invention relates generally to providing directory services in a distributed computing environment and, in particular, to a method for associating a signature with a given attribute in a directory.

2. Description of the Related Art

A directory service is the central point where network services, security services and applications can form an integrated distributed computing environment. Typical uses of a directory services may be classified into several categories. A "naming service" (e.g., DNS and DCE Cell Directory Service (CDS)) uses the directory as a source to locate an Internet host address or the location of a given server. A "user registry" (e.g., Novell NDS) stores information about users in a system composed of a number of interconnected machines. The central repository of user information enables a system administrator to administer the distributed system as a single system image. Still another directory service is a "white pages" lookup provided by some e-mail clients, e.g., Netscape Communicator, Lotus Notes, Endora and the like.

With more and more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes.

LDAP is rapidly becoming the standard protocol for accessing attributes in client-server based distributed directories. While standardized protocols like LDAP are advantageous, the key to accessing a proper attribute in a directory service is implementation of a robust directory schema. Schema standardization, however, will be much more problematic.

In particular, standardized schema rules will state that each application should store its attributes in a part of the schema that is unique to the application. This rule will exist to prevent applications from storing attributes in the same location in the schema, which may give rise to interfering attributes. Other attributes, however, such as user credentials, will be stored in locations that are standardized so that all applications can access the same attribute. These so-called common attributes will move forward and change format as needed to address new application capabilities. However, attributes used by multiple applications must remain the same to support legacy applications. One solution to this problem may be to create new locations for new versions of attributes, but this creates a synchronization problem. The representative schema in FIG. 1 illustrates why this is the case. If the attribute is migrated in the original location, legacy (i.e. down level clients) may not work.

For purposes of illustration, attribute $Attrib_x[\ ]$ is assumed to be a set of attributes, such as a complex object. The attribute $Attrib_x[\ ]$ may be a flat list, a linked list, an array, or any other convenient data structure. With the first release (e.g. V1.0) of a given subsystem or application, the schema puts $Attrib_x[\ ]$ at a given location (e.g., \DIR1\DIRA) in the schema. When the second release (e.g., V1.1) of the same subsystem or application occurs, the schema is extended, with the next version of $Attrib_x[\ ]$ (V11) being added as shown. A similar extension is provided when the next release (V1.2) occurs, and so on. Thus, in the prior art, with each new release, the schema leaves the old attributes unchanged and where they were, and stores the new attributes somewhere else. This extension must occur without disruption to down level (i.e. earlier versions) of the subsystem or application. With multiple versions and this complex schema, the directory is required to implement additional routines to synchronize the attributes. This is an expensive and complex task for standard directory operations.

The present invention addresses these problems.

BRIEF SUMMARY OF THE INVENTION

According to the invention, attributes are stored in a directory together with a signature that identifies given information, e.g., the purpose and version of the attribute. Thus, when an attribute is migrated to a new value, e.g., upon the release of a new application version, the directory schema need not be extended. Rather, the attribute may be maintained in the schema is the same location as was used with an earlier application version. This directory schema enables a directory client application to query an attribute and determine its version. In addition, a new client application can perform attribute conversion for down level attributes that it understands how to convert and interpret. Further, this schema facilitates the implementation of an attribute conversion layer to a directory client so that new attributes may be easily converted to legacy format on behalf of a legacy application. Alternatively, an attribute proxy may be used for this purpose.

Thus, according to the present invention, attributes of objects that are used by more than one directory application are provided with additional information, an attribute signature. The signature may be plaintext, or it may be encoded or encrypted. An attribute used by more than one directory application is a common attribute. An attribute signature may comprise a name of an owning application (i.e. the application that generates the signature), data identifying a version of the attribute, a timestamp, other identifying information and, optionally, a given function to be applied to the attribute. Use of attribute signatures enables an application to query an attribute to determine its version and to efficiently manage information in the directory.

Thus, for example, a method for managing information begins by storing in the directory an attribute that is shared by a plurality of applications together with a signature identifying a then-current version of the attribute. In response to a query from an application, the signature is used to determine whether the application expects to receive an earlier version of the attribute (e.g., because it is a down level, or earlier, version of the application). Whether or not the application expects to receive an earlier version of the attribute, a query is initiated to the directory for the then-current version of the attribute. This query is initiated by an attribute leveling plug-in or proxy. The then-current version of the attribute is then returned from the directory. The plug-in or proxy, however, returns the earlier version of the attribute to the down-level application. This operation ensures that the directory operation initiated by the down level client does not fail.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 7 is a block diagram of an attribute leveling proxy in accordance with a second embodiment of the present invention.

DETAILED DESCRIPTION OF THE PREFERRED EMBODIMENT

Figure 2:
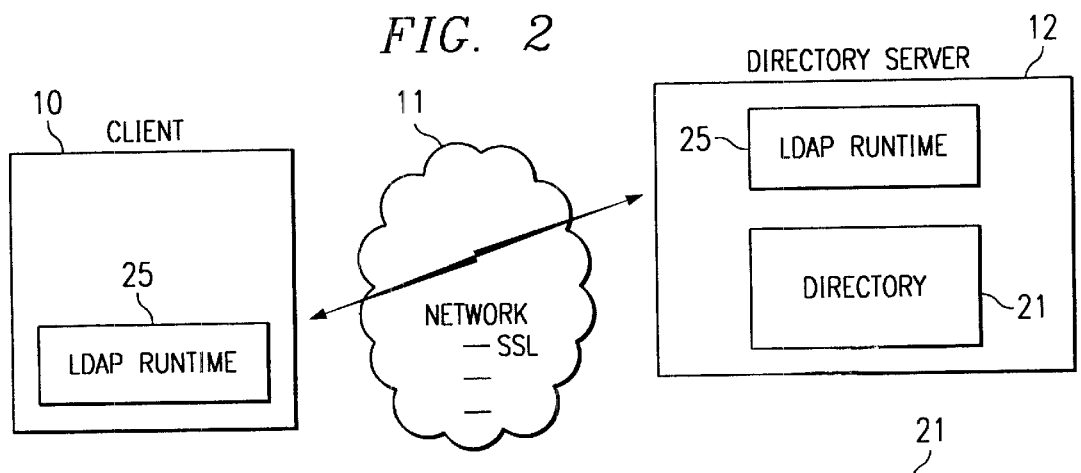
FIG. 2 is a representative LDAP directory service implementation.

A block diagram of a representative LDAP directory service in which the present invention may be implemented is shown in FIG. 2. As is well-known, LDAP is the lightweight directory access protocol, and this protocol has been implemented in the prior art, e.g., as either a front end to the X.500 directory service, or as a standalone directory service. The present invention, as will be seen, is not limited for use with an LDAP-compliant directory.

Figure 3:
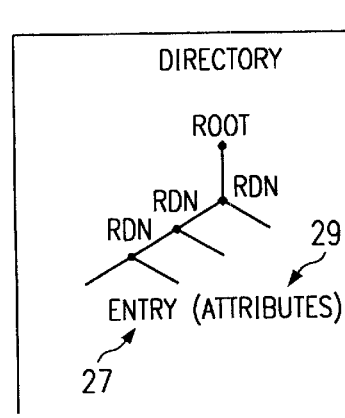
FIG. 3 is a simplified LDAP directory.

According to the known protocol, a client machine 10 (and, in particular, a client application) makes a TCP/IP connection to an LDAP server 12, sends requests and receives responses. LDAP server 12 supports a directory 21 as illustrated in a simplified form in FIG. 3. Each of the client and server machines further include a directory runtime component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, .jpeg file, etc.) and how these values are constrained during a particular directory operation. Entries are stored in a given table (e.g., ldap_entry) that includes entry IDs, parent IDs, a create and last modified timestamp, together with the complete entry in string format. Each attribute has an associated attribute table.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root. The LDAP search can be applied to a single entry (a base level search), an entry's children (a one level search), or an entire subtree (a subtree search). Thus, the scope supported by LDAP search are: base, one level and subtree. LDAP does not support search for arbitrary tree levels and path enumeration.

Figure 4:
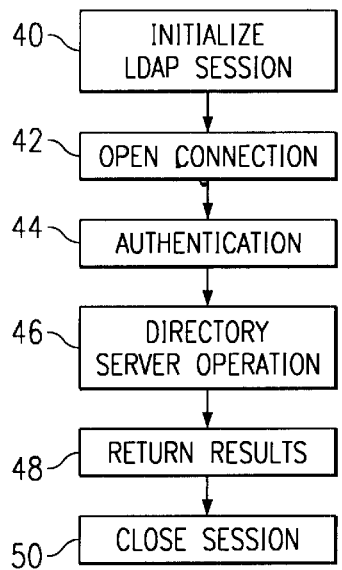
FIG. 4 is a flowchart of an LDAP directory session.

LDAP includes an application programming interface (API), as described in "The C LDAP Application Program Interface", IETF Working Draft, Jul. 29, 1997, which is incorporated herein by reference. An application on a given client machine uses the LDAP API to effect a directory service "session" according to the flowchart of FIG. 4. At step 40, an LDAP session with a default LDAP server is initialized. At step 42, an API function ldap_init ( ) returns a handle to the client, and this handle may allow multiple connections to be open at one time. At step 44, the client authenticates to the LDAP server using, for example, an API ldap_bind ( ) function. At step 46, one or more LDAP operations are performed. For example, the API function ldap_search ( ) may be used to perform a given directory search. At step 48, the LDAP server returns the results of the directory search, e.g., one or more database elements that meet the search criteria. The session is then closed at step 50 with the API ldap_unbind( ) function then being used to close the connection.

As described above, there is one attribute table per searchable attribute. Each LDAP entry is assigned an unique identifier (EID). The columns for the attribute table are: [EID, Attribute value].

According to the present invention, attributes of objects that are used by more than one directory application or subsystem are provided with additional information, a so-called attribute signature. An attribute used by more than one such application or subsystem is sometimes referred to herein as a common attribute. An attribute signature typically comprises a name of an owning application (i.e. the application that generated the signature), data identifying a version of the attribute, a timestamp, other identifying information and, optionally, a given function that may be applied to the attribute. The attribute signature may be plaintext, e.g., ASCII, text-only, alphanumeric, or the like. Typically, the signature is plaintext, although the signature may also be encoded or encrypted if desired. Of course, if the signature is encoded or encrypted, a corresponding decoding or decrypting routine will be required. The actual format of the signature is not limited to any particular symbols or representation. Moreover, the word signature should not be taken to limit the invention either. According to the invention, a signature is any data or other information appended to or otherwise associated with an attribute or attribute value and that facilitates the inventive directory schema.

Figure 1:
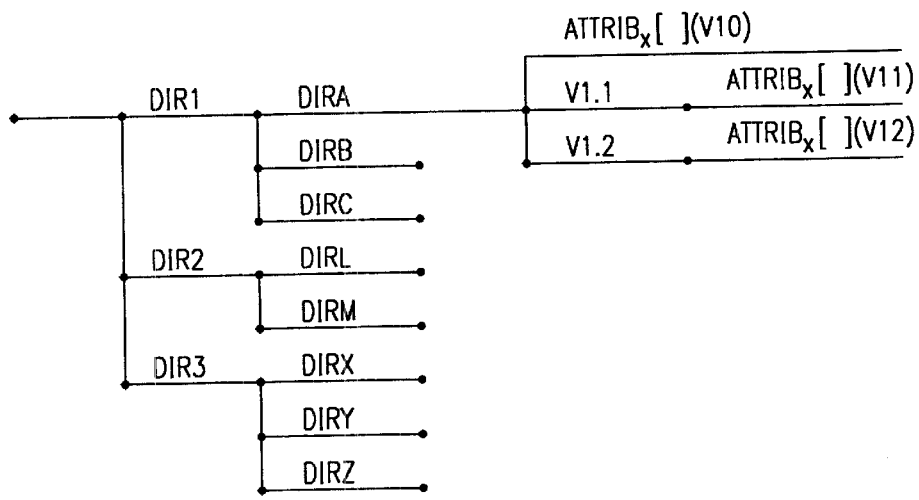
FIG. 1 is a representative schema of the prior art.
Figure 5:
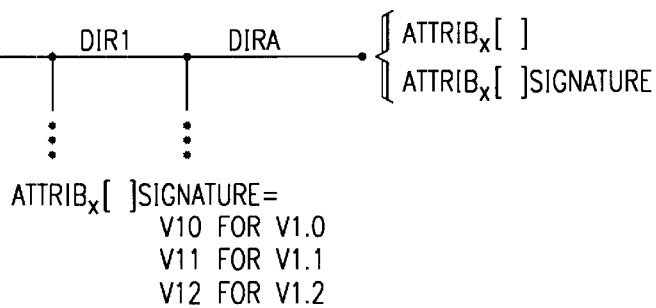
FIG. 5 is a simplified representation of the directory schema of the present invention.

FIG. 5 is a simplified representation of the directory schema according to the preferred embodiment of the present invention. This figure should be contrasted with FIG. 1. According to the present invention, the attribute $Attrib_x[\ ]$ previously described is provided with a signature, called Attribx Signature. As can be seen, in this illustrative example, the Attribx Signature=V10 for Version 1.0 of the client application, V11 for Version 1.1, and V!@ for Version 1.2 of that application. When the new version of the application is installed, the attribute remains at the same position in the schema (namely, \DIR1\DIRA), however, the signature is appended to the attribute in the manner illustrated. Thus, contrary to the schema illustrated in FIG. 1, the inventive schema does not require that an earlier version of the attribute be retained or that the schema be extended to accommodate the new version(s). Of course, one of ordinary skill in the art will appreciate that it may be desirable to use a directory schema that incorporates some attributes that are stored according to the known technique of FIG. 1, as well as still other attributes (together with their signatures) that are stored according to the inventive technique.

The inventive schema and the use of attribute signatures avoids several problems of the prior art. Thus, for example, if a version 1.0 client makes a request for the attribute that has been migrated to version 1.1 or 1.2, that client does not receive the version of the attribute that it expects. Nevertheless, the down level client (in such case) merely returns an error message. This operation should be compared with a similar operation in the prior art, wherein the down level client might crash; at best, the results would be unpredictable.

According to the invention, at least two different types of leveling mechanisms may be used to process the migrated attribute so that the down level client obtains the version of the attribute that it expects to receive. These mechanisms are now described.

Figure 6:
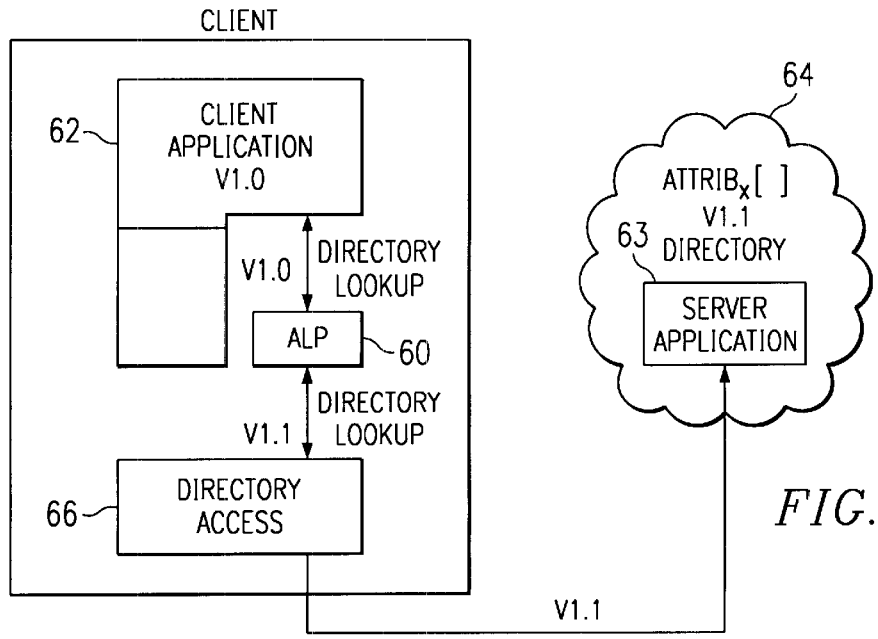
FIG. 6 is a block diagram of an attribute leveling plug-in in accordance with a first embodiment of the present invention.

The first mechanism is an attribute leveling plug-in (ALP), which is given code that comprises part of or an adjunct to a directory client application and that provides an attribute translation function for the application if the attribute has been migrated to a higher version. FIG. 6 illustrates this approach. In this embodiment, the ALP 60 is a plug-in to a directory client application 62, running Version 1.0 (for the sake of illustration). The client application cooperates with a server application 63 running on the directory server. It is assumed that a higher level version of the client application (e.g., Version 1.1) has already been installed elsewhere. Accordingly, the directory 64 stores the $Attrib_x[\ ]$ attribute having a signature, e.g., V11. The client also includes a directory access layer 66, as is well-known. The attribute leveling plug-in 60 knows (or can ascertain) the current state of the directory attribute. When the application makes a directory lookup, it requests the down level version of the attribute (namely, $Attrib_x[\ ]$ for Version 1.0) because this application is not aware that there is a higher level attribute already stored in the directory. According to the present invention, this request is intercepted by the attribute leveling plug-in 60. The plug-in 60, because of the signature, knows that the current version of $Attrib_x[\ ]$ is V11, and thus the plug-in substitutes the expected version and issues the directory lookup to the directory access layer 66. Because the directory lookup identifies a correct version, the lookup is not rejected. The directory 64 then returns the attribute (namely, the attribute with value Version 1.1) to the directory access layer 66. Access layer 66 forwards the response back to the ALP 60, which converts the attribute back to its Version 1.0 value. The attribute is then returned to the application. Thus, the application receives the attribute it expects, although the attribute actually stored in the directory has been migrated to a higher level.

To give a concrete example, assume that the Version 1.0 attribute includes given address information, e.g., a street, and a city/state identifier. Thus, Attribx for Version 1.0 may be [123 Main Street, Dallas, Tex.]. The Version 1.1 attribute is a superset of the Version 1.0 attribute and thus, for example, may also include a zip code, e.g., [123 Main Street, Dallas, Tex., 75230]. When the Version 1.0 directory client performs a directory lookup, it expects to receive only the simplified attribute [namely, 123 Main Street, Dallas, Tex.]. When the query is made, however, the directory actually returns 123 Main Street, Dallas, Tex., 75230. The ALP strips off the zip code field because it knows (as a result of the signature) that the down level client is only expecting to receive the down level attribute. Without the ALP, the behavior at down level clients would be unpredictable.

The ALP functionality need not be implemented in the directory client application as illustrated in FIG. 6. An alternate embodiment of the present invention provides the same functionality using an attribute leveling proxy 70 such as illustrated in FIG. 7. In this embodiment, there is a client machine 72 having a down level client application 74 and a directory access layer 76 as previously described. In this example, application 74 makes a directory lookup in the usual manner. The lookup issued by the directory access layer 76 is intercepted by the attribute leveling proxy 70 which, as described above, issues the directory lookup to the directory 78 only after substituting the correct version number. Of course, for Version 1.1. clients, such as client 82, the attribute leveling proxy 70 functions merely as a pass-through as there is no need to substitute the appropriate version number. When the Version 1.1 attribute is returned from the directory 78, the attribute leveling proxy 70 performs the necessary translation, stripping off whatever data is not supported by the down level application, and returns the attribute to the requesting client.

The embodiment illustrated in FIG. 7 is advantageous as it does not require any changes to the directory client application. Moreover, the attribute leveling proxy may be used by multiple applications, even those applications that do not require any attribute level translation.

The present invention provides numerous advantages over the prior art. According to the schema, new versions/formats of attributes may be stored in existing locations in the schema. The inventive schema is simple to implement, and it obviates storage of attribute values that are associated with down level client applications. The resulting schema is much simpler to manage and more robust as compared to the prior art. As illustrated above, a given application can query the directory and easily identify which version of an attribute is being supported. Thus, the format of common attributes (i.e. attributes that are shared by multiple applications) are easily changes and migrated to address new application capabilities. Nevertheless, down level applications (e.g., those associated with legacy applications) may still query the directory and receive attributes that they expect to receive, despite the fact that the attributes actually stored have been migrated to a new superset value. As a result, an improved distributed directory is provided. Another benefit is that, even if an attribute has not been migrated, new level clients may "level" the old style attributes themselves. In this regard, it should be noted that code in older versions of a client application cannot possibly be aware of new style attributes, whereas new clients can be aware of old style attributes.

Although the preferred embodiment has been described in the context of an LDAP directory, for example, with a relational database backing store, the inventive attribute signature technique and schema may be implemented in any distributed directory. Thus, the present invention is not limited to use with hierarchical directories. Rather, as noted above, the techniques described herein may be implemented in conjunction with any higher level directory structure in which common attributes are stored on behalf of a plurality of client applications. Any application or platform that stores common attributes in a distributed directory thus may take advantage of the present invention.

One of the preferred embodiments of the attribute leveling plug-in or proxy of this invention is as a set of instructions (e.g., computer program code) in a code module resident in or downloadable to the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described my invention, what I claim as new and desire to secure by letters patent is set forth in the following claims.

What is claimed is:

1. A method for managing information in a directory, comprising the steps of:

for an attribute shared by a plurality of applications, storing the attribute in the directory together with a signature identifying a then-current version of the attribute;

in response to a query, using the signature to determine whether an application that generates the query expects to receive an earlier version of the attribute;

if the application expects to receive an earlier version of the attribute, initiating a query to the directory for the then-current version of the attribute; and returning the earlier version of the attribute to the application.

2. The method as described in claim 1 wherein the directory returns the then-current version of the attribute in response to the query generated by the application.

3. The method as described in claim 2 further including the step of modifying the then-current version of the attribute to generate the earlier version of the attribute that is returned to the application.

4. The method as described in claim 1 wherein the signature also identifies an application that generated the signature.

5. The method as described in claim 1 wherein, if the application does not expects to receive an earlier version of the attribute:

initiating the query to the directory for the then-current version of the attribute; and returning the then-current version of the attribute to the application.

6. The method as described in claim 1 wherein the directory is a Lightweight Directory Access Protocol (LDAP) directory service.

7. A method for storing information in a directory, comprising the steps of:

for each attribute used by a plurality of applications, storing the attribute in a respective common part of the directory;

signing each attribute with a respective signature that indicates a current version of the attribute;

returning to one of the plurality of applications a proper version of the attribute by referring to the signature.

8. The method as described in claim 7 wherein a respective signature also includes an identification of an application that generated the signature.

9. The method as described in claim 7 wherein the proper version of the attribute is a superset of the attribute.

10. The method as described in claim 7 wherein the proper version of the attribute is subset of the attribute.

11. A distributed directory for storing information, comprising:

a set of common attributes shared by a plurality of 10 applications, wherein each of the common attributes includes a signature that indicates an owning application and a current version of the attribute; and means responsive to a client request and the signature for returning to one of the plurality of a proper version of the attribute.

12. The distributed directory as described in claim 11 wherein the proper version of the attribute is a superset of the attribute.

13. The distributed directory as described in claim 11 wherein the proper version of the attribute is subset of the attribute.

14. The distributed directory as described in claim 11 wherein the directory is compliant with the Lightweight Directory Access Protocol (LDAP).

15. An application for use with a directory in which an attribute shared by a plurality of applications is stored together with a signature identifying a then-current version of the attribute, comprising:

directory client code; and attribute leveling code (a) for using the signature to determine whether the application, in response to a query generated by the directory client code, expects to receive an earlier version of the attribute, (b) for initiating a query to the directory for the then-current version of the attribute if the application expects to receive an earlier version of the attribute, and (c) for returning the earlier version of the attribute to the application.

16. In a client directory application for use with a distributed directory in which an attribute shared by a plurality of applications is stored together with a signature identifying a then-current version of the attribute, the improvement comprising:

means for using the signature to determine whether the application, in response to a query generated, expects to receive an earlier version of the attribute;

means for initiating a query to the directory for the then-current version of the attribute if the application expects to receive an earlier version of the attribute; and means for returning the earlier version of the attribute to the application.

17. A proxy for use in combination with a distributed directory in which attributes shared by a plurality of applications are stored together with signatures, wherein a given signature identifies a then-current version of the attribute, comprising:

means responsive to a query from one of the applications for using the signature to determine whether the application expects to receive an earlier version of the attribute;

means for initiating a query to the directory for the then-current version of the attribute if the application expects to receive an earlier version of the attribute; and means for returning the earlier version of the attribute to the application.

18. The proxy as described in claim 17 further including:

means for initiating a query to the directory for the then-current version of the attribute if the application does not expect to receive the earlier version of the attribute; and means for returning the then-current version of the attribute to the application.

19. A computer program product in a computer-readable medium for use in combination with a distributed directory in which attributes shared by a plurality of applications are stored together with signatures, wherein a given signature identifies a then-current version of the attribute, comprising:

means responsive to a query from one of the applications for using the signature to determine whether the application expects to receive an earlier version of the attribute;

means for initiating a query to the directory for the then-current version of the attribute whether or not the application expects to receive an earlier version of the attribute;

means for returning the earlier version of the attribute to the application if the application expects to receive an earlier version of the attribute; and means for returning the then-current version of the attribute to the application if the application expects to receive the then-current version of the attribute.

* * * * *

UNITED STATES PATENT AND TRADEMARK OFFICE
CERTIFICATE OF CORRECTION

PATENT NO. : 6,564,370 B1
DATED : May 13, 2003
INVENTOR(S) : Hunt

It is certified that error appears in the above-identified patent and that said Letters Patent is hereby corrected as shown below:

Column 7,
Line 57, cancel "expects" and insert therefor -- expect --.

Column 8,
Line 17, cancel "10".

Signed and Sealed this

Twentieth Day of January, 2004

JON W. DUDAS
*Acting Director of the United States Patent and Trademark Office*